May 1, 1962 H. V. SMITH 3,031,885
APPARATUS AND METHOD FOR TESTING LIQUID SHRINKAGE
Filed Nov. 25, 1960
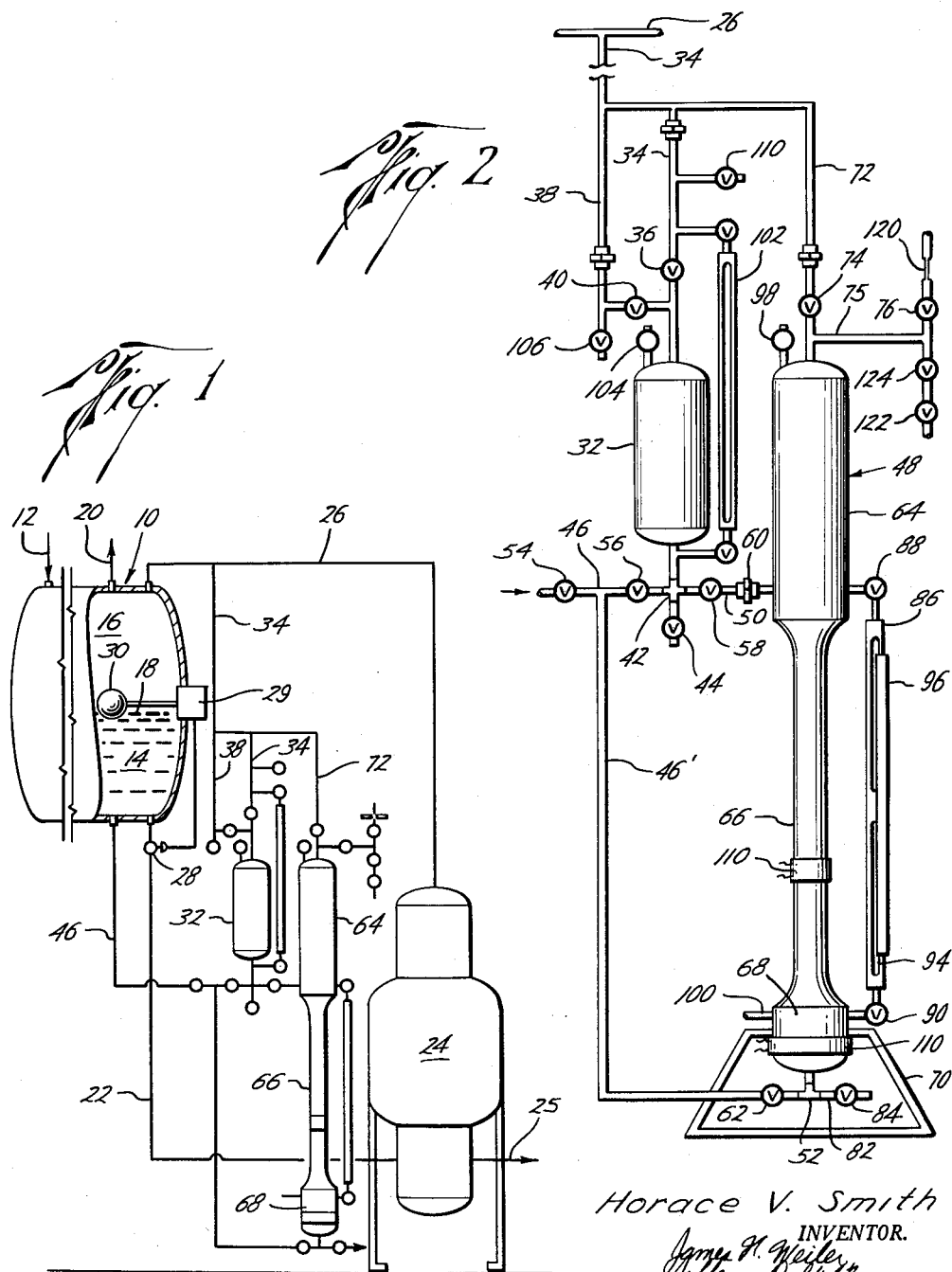
Horace V. Smith
INVENTOR.
BY
ATTORNEY

United States Patent Office 3,031,885
Patented May 1, 1962

3,031,885
APPARATUS AND METHOD FOR TESTING LIQUID SHRINKAGE
Horace V. Smith, Houston, Tex., assignor to Oil Metering and Processing Equipment Corp., Houston, Tex., a corporation of Texas
Filed Nov. 25, 1960, Ser. No. 71,494
6 Claims. (Cl. 73—53)

This invention relates to an apparatus and method for testing liquid shrinkage and more particularly relates to such an apparatus and method for determining the shrinkage in volume of liquid due to escaping gases and vapor when pressure on the liquid is reduced.

This is a continuation-in-part of United States Patent application No. 773,707 filed November 13, 1958 by Horace V. Smith for an Apparatus and Method for Testing Liquid Shrinkage, now Patent No. 2,990,714.

Many liquids when under pressure contain gases and/or condensed vapors that will escape from the liquid when pressure on the liquid is reduced resulting in a reduction in volume of the liquid after such reduction of pressure. For example, in crude oil flowing from oil wells under high pressures there is often gas which is not released until pressure on the crude oil is reduced. Likewise, in gas wells there is often produced distillate and/or condensate which include condensed vapors which will vaporize and reduce the volume of liquid when the pressure is reduced. This causes difficulty in the accurate metering of the volume of liquid produced by such wells.

It is conventional practice for oil well fluids from a well to be flowed into a separator under pressure approaching that of the well where the liquids are separated from the gases by gravity. From the separator the liquids flow to and through a meter where they are metered under the same pressure as the separator and then passed to a stock tank where they are stored under substantially atmospheric pressure with liquid from several other wells. It is often necessary to know the volume in the stock tank contributed by each of the wells. For example, where the wells are under separate ownership it is necessary to determine the amount contributed by each well or where for any of several reasons it is desired to test the flow of these wells. It is for these and other reasons that the liquids are metered prior to entering the stock tank. However, the volume recorded by the meters is not the same as the volume in the stock tank because the reduction of pressure on the liquids after they leave the meters permits gases and vapors in the liquids to escape thereby causing a volume shrinkage. One common way to determine this amount of shrinkage is to isolate all the wells but one from the stock tank and then compare the amount in the stock tank as shown by its gauge with the amount recorded by the meter and assume that for all flows thereafter the percentage of shrinkage will be the same. This has several obvious disadvantages. If the well conditions change this shrinkage does not remain constant. Additionally, the wells not being tested must have their flow stopped, or separate test facilities must be provided to isolate and test each well separately. This is particularly disadvantageous when flows are small so that it takes a considerable period to accumulate an appreciable volume or when the liquids are quite viscous. In the latter case it sometimes requires as much as 48 hours for all the gases and vapors to escape from the liquid.

It is to overcome these disadvantages that the apparatus and method of the present invention are directed.

It is an object of the present invention to provide an apparatus and a method for determining shrinkage in volume of liquid due to the escape of liquids and gases from the liquid after pressure on the liquid has been reduced.

A further object of the present invention is to provide a method of determining subsequent shrinkage in volume of liquid in a vessel containing the liquid and a gas under pressure where the shrinkage is caused by a reduction of pressure on the liquid after it leaves the vessel.

Another object of the present invention is to provide the combination of a first vessel closed to the atmosphere and containing a layer of liquid and a layer of gas under pressure and a second closed vessel approximate the first vessel, said vessels being so interconnected, constructed and arranged that the second vessel determines the shrinkage which will occur on liquid in the first vessel after pressure on such liquid is reduced after leaving the first vessel.

Another object of the present invention is to provide such a combination as just described in which is included a liquid accumulator chamber between the first and second vessels for accumulating and measuring samples of liquid.

A still further object of the present invention is to provide such combinations just mentioned in which the shrinkage in volume of the liquid may be easily and quickly determined at any time desired and at multiple stages of pressure reduction.

A still further object of the present invention is to provide such a combination which is economical to construct and operate and which is dependable in operation.

Other and further objects, features and advantages will be apparent from the following description of the presently preferred example of the invention, given for the purpose of disclosure and taken in conjunction with the accompanying drawings where like character references designate like parts throughout the several views and where, FIGURE 1 is a partly diagrammatic side elevation of a first vessel in combination with the liquid accumulator chamber and second vessel of the invention and illustrating flow through a meter, and FIGURE 2 is an enlarged elevation of the accumulator chamber and second vessel of the combination of the present invention.

Referring now to FIGURE 1, there is illustrated a first vessel 10 (here shown as a separator), a liquid accumulator tank 32, a second vessel 48 and a meter 24. The first vessel 10 receives under pressure, at an inlet 12, well fluids consisting of liquids and gases with the liquids and gases separating by gravity into a layer of liquid 14 and a layer of gas 16 forming a gas-liquid interface 18. From the separator 10 through the gas outlet 20 the gases are allowed to pass under pressure to a gas gathering system, not shown.

As the liquids are collected in the separator 10 they are allowed to flow from the separator 10 by a line 22 to and through the meter 24. The meter 24 is maintained under pressure approximately the same as that of the separator 10 by the gas equalizing line 26 so that liquid leaving the meter 24 by a line 25 may be forced out by this pressure. The meter 24 is not part of the present invention, but is shown as a meter is commonly used in conjunction with the presently preferred example of the invention. Numerous types of meter 24 may be used such as the one described and claimed in Patent No. 2,853,877 issued September 30, 1958 for a Rigid Buoyancy Mass Liquid Meter upon the application of Horace V. Smith.

To control the level of the gas-liquid interface 18 in the separator 10 so that gas will not enter the line 22, a two-way valve 28, which is opened and closed by a valve control assembly 29 including a float 30 in the separator 10, is placed in the line 22. No further description of the valve control assembly 29 and valve 28 are necessary as they are conventional and not part of the present invention in that it is not necessary that the first vessel 10 be a separator. Any form of the first vessel 10 is satisfactory as long as it is closed to the atmosphere and is adapted to contain a layer of liquid and a layer of gas under pressure.

Referring now to both drawings, the liquid accumulator tank 32 is closed to the atmosphere and located approximate the first vessel 10. Extending from the top of the tank 32 is a gas line 34 which communicates with the gas equalizing line 26 which in turn is connected to the gas layer 16 in the first vessel 10. A manually operated two-way or cutoff valve 36 in the line 34 slightly above the tank 32 controls the flow of fluid into and out of the tank 32 through the line 34. Fluid communication is also established between a point on the line 34 below the cutoff valve 36 and the gas layer 16 in the first vessel 10 by means of a gas line 38 connected to the gas line 34 above and below the cutoff valve 36. A cutoff valve 40 controls the flow of fluid through the line 38 and out of the tank 32.

At the bottom of the accumulator tank 32 is a four-way connection 42 with a drain valve 44 on the lower side thereof. Communicating between the liquid layer 14 in the first vessel 10 and the accumulator tank 32 through the four-way connection 42 is a liquid inlet line 46. Communicating between the accumulator tank 32 through the connector 42 and an upper portion of the second vessel 48 is a liquid line 50. A branch line 46' from the liquid inlet line 46 is connected to the second vessel 48 at its lowest portion through the T-connection 52. A cutoff valve 54 is provided in the liquid line 46 ahead of the branch line 46' and a cutoff valve 56 is provided in the inlet line 46 on the other side of the branch line 46'. A cutoff valve 58 and a restrictive orifice 60 are placed in the liquid line 50 leading to the second vessel 48. A cutoff valve 62 in the liquid line 46' controls the flow of liquid in that line into the bottom of the second vessel 48.

That portion of the system at the accumulator tank 32 between the cutoff valves 36 and 40 at the upper end and the cutoff valves 56, 44, and 58 at the lower end forms what is termed an accumulator chamber of which the greatest volume is the accumulator tank 32. Because this accumulator chamber receives liquid by gravity flow from the first vessel 10, the portion of the accumulator chamber desired to be filled must be at a lower level than the gas-liquid interface 18 in the first vessel 10. In operation, when the accumulator chamber is being filled with liquid, it will be completely filled to a high liquid level at the cutoff valve 36 and so the cutoff valve 36 as well as the accumulator tank 32 is placed at a lower level than the gas-liquid interface 18 in the first vessel 10.

This accumulator chamber supplies a known volume of liquid to the second vessel 48 so when the accumulator chamber is drained of liquid during shrinkage tests it is drained until all liquid in it has been forced past the cutoff valve 56 in a manner described later herein. A liquid level gauge 102 is secured at its upper end to the gas line 34 immediately above the cutoff valve 36 and at its lower end to a point just below the accumulator tank 32 so that the operator can see when the accumulator chamber is filled and when it is about to empty. By knowing the volume of the accumulator chamber and by always using its full volume when it is used the operator always knows the volume of liquid which passes from it to the second vessel 48.

Referring again to the second vessel 48, it is of a general elongate upstanding configuration and is located approximate the accumulator tank 32. The second vessel 48 includes a first or upper chamber 64 open to and aligned with a second or lower chamber 66 preferably having a substantially lesser horizontal dimension than the upper chamber 64. Formed at the bottom of the lower chamber 66 and open to the chamber 66 is a liquid reservoir 68 of larger cross-sectional dimension than the lower chamber 66. These chambers 64 and 66 and the reservoir 68 are preferably cylindrical for ease of construction and are secured to one another in any conventional manner as by welding. The entire second vessel 48 is supported in any conventional means such as by the base 70.

The second vessel 48 is placed near the accumulator tank 32 at such a level that the lower chamber 66 will always have a portion below the level of the liquid layer in the first vessel 10. By being so placed liquid may flow by gravity from the first vessel 10 into the second vessel 48 as later described.

Passage for gas into the second vessel 48 is provided at the upper end of the first chamber 64 by a gas line 72 connected to the gas line 34. The flow of gas through this line 72 into the second vessel 48 is controlled by the cutoff valve 74. Exhaust of gas from the second vessel 48 is permitted through an orifice 120 or a back pressure valve 122 communicating with the second vessel 48 by being connected through a line 75 to the gas line 72 below the cutoff valve 74. Cutoff valves 76 and 124 immediately upstream of the restrictive orifice 120 and the back pressure valve 122 respectively permit the operator to select which path will be taken by gas exhausting from the second vessel 48.

Liquids are drained out the second vessel 48 through a valve 84 in a liquid outlet line 82 connected through the T-connection 52 at the bottom of a liquid reservoir 68.

A liquid level gauge 86 is secured to the second vessel 48 in communication with the interior portions above and below the second chamber 66 by the connection 88 to the upper chamber 64 and the connection 90 to the liquid reservoir 68. This liquid level gauge 86 includes a reflex gauge glass 94 of sufficient strength to withstand pressure within the second vessel and an indicator scale 96 having indicia thereon reading directly in the volume of liquid in the second vessel 48.

A gas pressure gauge 98 is attached to the first chamber 64 and a thermometer 100 communicates with the liquid reservoir 68. A pressure gauge 104 is provided in the upper part of the accumulator tank 32. A drain valve 106 is provided at the lower end of the gas line 38 and another drain valve 110 is provided in the gas line 34 ahead of cutoff valve 36.

In operation of the combination and method of the present invention, the second vessel 48 and the accumulator tank 32 are isolated from the first vessel 10 by closing the valves 54, 106, 40, 36, and 74 when no shrinkage test is desired. When it is desired to make a shrinkage test the cutoff valves 40 and 36 in the gas lines 38 and 34 respectively, the cutoff valve 58 in the liquid line 50 from the bottom of the accumulator tank 32, and the cutoff valve 74 in the gas line 72 to the top of the second vessel 48 are opened. All other valves in the lines to the accumulator tank 32 and the second vessel 48 are closed. The valve 84 in the drain line 82 from the second vessel 48 is partially opened allowing gas under pressure from the first vessel 10 to sweep through the gas lines 38, 34, and 72, the accumulator tank 32, the second vessel 48, and out the lower end of the second vessel 48 purging all these lines and vessels of all fluid foreign to that contained in the first vessel 10. The valve 84 in the liquid outlet line 82 from the second vessel 48 is then closed allowing pressure in the accumulator tank 32 and in the vessel 48 to build up equal to the pressure in the first vessel 10. During the purging of the system and the build-up of pressure, the pressure in the first vessel will not drop because the well fluids entering the inlet 12 into the first vessel 10 make up for this loss of fluid.

The first test of shrinkage desired may be that of shrinkage caused by flash separation which type of separation when used here means the separation into liquid and gas that occurs when a liquid flows from a first vessel under pressure into a second vessel under lesser pressure, with the pressure that moves the liquid into the second vessel being the same as in the first vessel. This type of separation often occurs when liquid flows from a separator into a stock or storage tank which is at atmospheric pressure.

With this type of test all the valves in the lines leading to and from the accumulator tank 32 and the second vessel 48 are closed except the cutoff valve 36 in the gas line 34 from the top of the accumulator tank 32. The cutoff valves 54 and 56 in the liquid inlet line 46 are then opened so that liquid from the liquid layer 14 in the first vessel 10 enters the accumulator tank 32. When the liquid level reaches the cutoff valve 36 at the top of the accumulator tank 32 both the cutoff valves 56 and 36 are closed isolating the first vessel 10 from the liquid container 32. The pressure in the second vessel 48 may be reduced to atmospheric or any pressure between atmospheric and the pressure in the first vessel 10. If the pressure desired in the second vessel is above atmospheric the back pressure valve 122 from the second vessel 48 is set at the desired pressure and the cutoff valve 124 is opened reducing the pressure in the second vessel 48 to that set on the back pressure valve 122. The cutoff valve 40 in the gas line 38 is opened and then the cutoff valve 58 in the liquid line 50 between the bottom of the accumulator tank 32 and the second vessel 48 is opened. The pressure in the gas line 38, which is the same as that in the gas layer 16 in the first vessel, forces the liquid in the accumulator tank 32 through the orifice 60 into the upper chamber 64 where the reduction in pressure causes some of the liquid to flash with the resulting gas and vapor passing out the upper end of the second vessel 48 at the back pressure valve 122 and the remaining liquid falling to the lower part of the second vessel 48. The large area of the cross-section of the upper chamber 64 compared to the cross-sectional area of the orifice 60 reduces the velocity of the escaping gas and prevents entrainment of liquids which the escaping gas might otherwise carry.

When the accumulator chamber empties so that all liquid in the accumulator tank has passed the cutoff valve 58, the cutoff valve 58 is closed. The operator will know when all the liquid has passed this cutoff valve 58 because of the change in sound between the passage of liquid and the passage of gas into the second vessel 48. After the liquids and gases in the second vessel 48 have come to equilibrium, that is, when there is no more escape of gases and vapors from the liquids, the volume of liquid in the second vessel 48 is noted on the indicator scale 96. The volume of liquid which passes into the second vessel 48 is known because the liquid accumulator chamber was filled completely to the cutoff valve 36 and emptied completely. Some liquid entering the accumulator chamber while it is filling will pass through the cutoff valve 36 and into the line 34 above the cutoff valve 36 before the cutoff valve 36 is cut off. However, this will not affect the accuracy of measurement of the accumulator chamber as only the liquid that is below the cutoff valve 36 will be forced out by pressure in the line 38.

The volume of liquid in the second vessel 48 is then compared with the volume of liquid known to have passed into that vessel and the difference in volume is the shrinkage caused by flash separation.

Because the liquid reservoir 68 is of larger horizontal dimensions than the second chamber 66, the second vessel 48 may contain a larger sample of liquid without increasing the height of the vessel 48 than would be true if the horizontal dimensions of the second chamber 66 were carried to the bottom of the second vessel 48. The reduction of cross-sectional dimensions in this second chamber 66 in which the liquid is measured results in a greater vertical change of liquid level and hence greater accuracy for a given change of volume than if the second chamber 66 were of the same diameter as the liquid reservoir 68.

In some instances flash separation may be carried out with the pressure in the second vessel at atmospheric rather than above atmospheric. If this is done the procedure just described is followed except that the back pressure valve 122 is cut off by the valve 124 and the line 75 is opened to the atmosphere through the orifice 120. This causes the pressure in the second vessel 48 to remain at atmospheric during the separation. The orifice 120 reduces the volume of flow out the line 75 and helps prevent entrainment of liquids which the escaping gas might otherwise carry.

In some other instances in the testing of shrinkage caused by flash separation it may be more representative of the actual conditions being tested for the liquid to be discharged in the second vessel 48 against a head of liquid rather than to the atmosphere in that vessel. If this type of test is desired, a known volume of liquid is first placed in the second vessel 48 to provide the desired hydrostatic head. Thereafter the test is performed in the same manner as either of those previously described except that the liquid from the accumulator tank 32 does not pass through the cutoff valve 58 but instead is passed through the cutoff valve 56, the liquid line 46', the cutoff valve 62, and the T-connection 52 and enters the lower end of the second vessel 48 with the rate of flow into the lower end of the second vessel 48 being controlled by the amount the cutoff valve 62 or 56 is opened.

Instead of a test showing the results of shrinkage caused by flash separation it may be that a test showing the result of shrinkage by batch separation is desired. In batch separation the pressure on the liquid passing into the area of low pressure is not kept constant but is reduced by the volume of liquid withdrawn. If such a test is desired then it is performed exactly the same as any of the methods for performing the test for flash separation except that the cutoff valve 40 in the gas line 38 is closed while liquid passes from the accumulator tank 32 to the second vessel 48 so that additional gas pressure does not enter the accumulator tank 32. The pressure in the accumulator tank 32 reduces as the liquid drains from it.

Because liquid leaving the first vessel 10 may pass through several stages of treatment before reaching atmospheric pressure and because the pressure on the liquid by the gas above the liquid in each of these stages of treatment may be reduced, it is often desirable to know the percentage of shrinkage in volume at these various stages of treatment. For example, the gas pressure in the first vessel 10, which is a first stage of treatment, may be 1200 p.s.i.g., at a second stage of treatment 800 p.s.i.g., at a third stage of treatment 400 p.s.i.g., and at a fourth stage of treatment 0 p.s.i.g. This multiple reduction in pressure on the liquid caused by reduction of the gas pressure results in differential separation. The present invention may be used to determine the amount of shrinkage at the pressure of each of such multiple stages of differential separation.

In making a test for shrinkage occurring during differential separation the accumulator tank 32 is not needed. The cutoff valve 74 in the gas line 72 from the top of the second vessel 48 is opened and all other valves in the lines leading to and from the accumulator tank 32 and second vessel 48 are closed, causing pressure in the second vessel 48 to become the same as in the first vessel 10. After this occurs the valve 54 in the liquid inlet line 46 and the valve 62 in the liquid inlet line 46' are opened. This permits the liquid to flow by gravity into the second vessel 48 until the liquid level in the lower chamber 66 reaches the desired level shown on the indicator scale 96. The valve 62 in the liquid inlet line 46' is then closed. After the liquid level in the lower chamber 66 becomes constant the valve 74 in the gas line 72 is closed isolating the second vessel 48 from the first vessel 10 with the liquid and gas in the second vessel 48 being under the same pressure as the liquid and gas in the first vessel 10.

The liquid level in the reflex gauge 94 is noted. The outlet valve 76 is then opened allowing gas to pass out the orifice 120 until the pressure in the second vessel 48, as shown by the pressure gauge 98, reaches that of the second stage of treatment which for illustration here is 800 p.s.i.g. whereupon the cutoff valve 76 is closed. Because the gas has to pass through the orifice 120 its velocity is held down to such an extent that entrained liquids are not carried through it.

After the pressure in the second vessel 48 has reached 800 p.s.i.g. it is allowed to stabilize. After it has stabilized the drop in liquid level in the lower chamber 66 of the second vessel 48 is determined from the indicator scale 96. The valve 76 is again opened until the pressure in the second vessel drops to 400 p.s.i.g. at which time the valve 76 is closed and the drop in liquid level in the lower chamber 66 again noted. Thereafter the valve 76 is opened until the pressure in the second vessel 48 drops to 400 p.s.i.g. at which time the valve 76 is closed and the shrinkage noted. This is repeated for the pressure at each stage in which it is desired to know the shrinkage.

Because the treatment of one or more of such multiple stages may be at more elevated temperatures than the temperature of the liquid in the first vessel 10, the temperature of the liquid in the second vessel 48 may be raised to the temperature of such later stage of treatment by means of heating elements 110 of any conventional type such as the electrical heating elements indicated.

The foregoing description also describes the method, which method in general is that of determining shrinkage in volume of liquid in a vessel containing such liquid and a gas under pressure where the shrinkage is caused by reduction in pressure on the liquid after it leaves the vessel. The method includes flowing a known volume of the liquid from the vessel into a second vessel, providing a pressure in the second vessel less than the pressure in the first mentioned vessel, and measuring the loss of volume of liquid in the second vessel resulting from the decrease in pressure on the liquid.

The method in more particular as it relates to flash and batch separation includes flowing a portion of the liquid from the first vessel by gravity flow to an accumulator chamber until the pressures in the accumulator chamber and the first vessel are equal, flowing a known volume of liquid from the accumulator vessel into a second vessel while maintaining a lesser pressure in the second vessel than in the first vessel, and measuring the loss of volume in the liquid in the second vessel caused by the reduced pressure in the second vessel.

With regard to differential separation, the method includes flowing a portion of the gas from the first vessel into a closed second vessel until the pressures in the vessels are equal, flowing a known volume of the liquid in the first vessel into a portion of the second vessel while maintaining equal pressures in both vessels, isolating the vessels from each other, exhausting at least a portion of the gas from the second vessel, and measuring the loss of volume of liquid in the second vessel caused by exhausting the gas.

While the present invention has been described in connection with measuring the shrinkage of oil well fluids, it will be understood that the invention may be used with any types of liquid under pressure which have a shrinkage due to escaping gases or vapors upon reduction of pressure of the liquids.

The present invention, therefore, is well suited to carry out the objects and attain the advantages and ends mentioned as well as others inherent therein. Accordingly, the invention is to be limited only by the spirit thereof and the scope of the appended claims.

What is claimed is:

1. In combination, a first vessel closed to the atmosphere said vessel adapted to contain a layer of liquid and a layer of gas under pressure forming a gas-liquid interface, a closed liquid accumulator chamber approximate the first vessel adapted to be filled and drained of a known volume of liquid, said accumulator chamber being at a lower level than the gas-liquid interface in the first vessel, a closed second vessel approximate the accumulator chamber, a gas line between the gas layer in the first vessel and an upper portion of the accumulator chamber, a gas line between the gas layer in the first vessel and an upper portion of the second vessel, a liquid inlet line between the liquid layer in the first vessel and the accumulator chamber, a liquid line between a lower portion of the accumulator chamber and the second vessel for draining a known volume in the accumulator chamber into the second vessel, a valve in each said line, a gas exhaust valve connected to an upper portion of the second vessel, a drain valve connected to the second vessel at its lowest portion, and a liquid level gauge in communication with the interior of the second vessel at two vertically spaced points.

2. The combination of claim 1, including a second gas line between the gas layer in the first vessel and an upper portion of the accumulator chamber and a valve in said second gas line.

3. In combination, a first vessel closed to the atmosphere, said vessel adapted to contain a layer of liquid and a layer of gas under pressure forming a gas-liquid interface, a closed liquid accumulator chamber approximate the first vessel adapted to be filled and drained of a known volume of liquid, said accumulator chamber being at a lower level than the gas-liquid interface in the first vessel, a closed second vessel approximate the accumulator chamber, said second vessel having an upper chamber and a lower upstanding chamber open to the upper chamber, said lower chamber being of substantially lesser horizontal dimension than the upper chamber, a gas line between the gas layer in the first vessel and an upper portion of the accumulator chamber, a gas line between the gas layer in the first vessel and an upper portion of the second vessel, a liquid inlet line between the liquid layer in the first vessel and the accumulator chamber, a liquid line between a lower portion of the accumulator chamber and a second vessel for draining a known volume of liquid in the accumulator chamber into the second vessel, a valve in each said line, a gas exhaust valve connected to the upper chamber in the second vessel, a drain valve connected to the second vessel at its lowest point, and a liquid level gauge in communication with the interior of the second vessel at two vertically spaced points.

4. The combination of claim 3 including a second gas line between the gas layer in the first vessel and an upper portion of the accumulator chamber and a valve in such second line.

5. A method of determining shrinkage in volume of liquid in a first vessel containing said liquid and a gas under pressure where the shrinkage is caused by reduction in pressure on the liquid after it leaves the first vessel, said method comprising flowing a portion of the gas in the first vessel into a liquid accumulator chamber until the gas pressure in the first vessel and accumulator chamber are equal, flowing a portion of the liquid into the accumulator chamber, flowing a known volume of the liquid from the accumulator chamber into a second vessel while maintaining less in the second vessel than the pressure in the first vessel and the liquid accumulator chamber and while maintaining the same pressure in the accumulator chamber as in the first vessel, and measuring the loss of volume of liquid in the second vessel caused by the reduction in pressure on the liquid.

6. A method of determining shrinkage in volume of liquid in a first vessel containing said liquid and a gas under pressure where the shrinkage is caused by reduction in pressure on the liquid after it leaves the first vessel, said method comprising flowing a portion of the gas in the first vessel into a closed liquid accumulator chamber until the gas pressures in the first vessel and liquid accumulator chamber are equal, flowing a portion of the liquid into the liquid accumulator chamber, isolating the first vessel and accumulator chamber from each other, flowing a known volume of the liquid from the accumulator chamber into a second vessel while maintaining less pressure in the second vessel than in the accumulator chamber, and measuring the loss of volume of liquid in the second vessel caused by the reduction in pressure on the liquid.

No references cited.